(12) United States Patent
Reicher et al.

(10) Patent No.: US 9,521,400 B2
(45) Date of Patent: Dec. 13, 2016

(54) METHOD AND DEVICE FOR PROCESSING IMAGES FROM IMAGE DATA

(71) Applicant: Bayerische Motoren Werke Aktiengesellschaft, Munich (DE)

(72) Inventors: Thomas Reicher, Grafing (DE); Guenter Bauer, Petershausen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 260 days.

(21) Appl. No.: 14/491,295

(22) Filed: Sep. 19, 2014

(65) Prior Publication Data

US 2015/0002640 A1    Jan. 1, 2015

Related U.S. Application Data

(63) Continuation of application No. PCT/EP2013/055141, filed on Mar. 13, 2013.

(30) Foreign Application Priority Data

Mar. 21, 2012 (DE) .......................... 10 2012 204 541

(51) Int. Cl.
*H04N 13/02* (2006.01)
*G06T 15/20* (2011.01)
(Continued)

(52) U.S. Cl.
CPC ........... *H04N 13/0275* (2013.01); *B60R 11/04* (2013.01); *G06T 15/205* (2013.01); *G06T 19/006* (2013.01); *B60R 2300/105* (2013.01)

(58) Field of Classification Search
CPC .............. H04N 13/0275; B60R 11/04; B60R 2300/105; G06T 15/205; G06T 19/006
(Continued)

(56) References Cited

U.S. PATENT DOCUMENTS 8,754,760 B2    6/2014  Augst
2006/0221072 A1*  10/2006  Se .......................... G01C 11/06
                                                                345/420
(Continued)

FOREIGN PATENT DOCUMENTS

DE          101 36 649 B4      2/2007
DE     10 2008 034 594 A1      1/2010

OTHER PUBLICATIONS

German Search Report dated Nov. 28, 2012 with English Translation (ten (10) pages).
(Continued)

*Primary Examiner* — Allen Wong
(74) *Attorney, Agent, or Firm* — Crowell & Moring LLP

(57) ABSTRACT

Image data of respective images are recorded by multiple cameras that are arranged on a vehicle. A geometry of a three-dimensional environment model is provided, which has a level ground region that lies in a ground plane of the vehicle and which has a surface that has a ground surface of the level ground region and that encloses an ambient space, which also includes the vehicle. The image data of the respective images of the various cameras are projected on the surface of the three-dimensional environment model as environment model image data. Image data to be signaled of an image to be displayed from a view of a virtual camera on to the surface of the three-dimensional environment model are determined. This occurs, for a view that includes at least a portion of the vehicle, in the sense that a specified representative object of the vehicle is embedded in the three-dimensional environment model and at least a partial region of the representative object is transparently displayed such that the view through the partial region on to a respective partial surface region of the surface of the three-dimensional environment model is made possible.

10 Claims, 4 Drawing Sheets

(51) Int. Cl.
*G06T 19/00* (2011.01)
*B60R 11/04* (2006.01)

(58) Field of Classification Search
USPC .......................................... 348/47
See application file for complete search history.

(56) References Cited

U.S. PATENT DOCUMENTS

2010/0245573 A1* 9/2010 Gomi .................. B60R 1/00
348/148
2012/0008828 A1* 1/2012 Yanoff ................. G01T 7/00
382/103

OTHER PUBLICATIONS

International Search Report dated Jul. 8, 2013 with English translation (five (5) pages).
"360° Wrap-Around Video Imaging Technology Ready for Integration with Fujitsu Graphics SoCs," Fujitsu, 2010 (twelve (12) pages) (XP002698425).
"Wrap-Around Video Imaging Technology—Youtube Video," Fujitsu, Aug. 11, 2011 (twelve (12) pages) (XP002698426).
"Graphic Solution to Visually Support the Driver's Safety Omniview System," Fujitsu FIND, vol. 29, No. 3, 2011 (four (4) pages) (XP002698427).

* cited by examiner

METHOD AND DEVICE FOR PROCESSING IMAGES FROM IMAGE DATA

CROSS REFERENCE TO RELATED APPLICATIONS

This application is a continuation of PCT International Application No. PCT/EP2013/055141, filed Mar. 13, 2013, which claims priority under 35 U.S.C. §119 from German Patent Application No. 10 2012 204 541.4, filed Mar. 21, 2012, the entire disclosures of which are herein expressly incorporated by reference.

BACKGROUND AND SUMMARY OF THE INVENTION

The invention relates to a method and a device for the image processing of image data of respective images, which are recorded by multiple cameras that are arranged on a vehicle.

Vehicles are increasingly equipped with multiple cameras that are attached externally, in other words on the periphery of the vehicle. In this way, such a camera can, for example, be arranged on a side mirror of a vehicle. Such cameras can assist the vehicle driver in perceiving the external region of the vehicle.

In this way, vehicle drivers can be assisted, for example, in parking maneuvers when entering or leaving a parking space. Furthermore, they can also be assisted when passing through narrow or blind passages.

The object underlying the invention is to create a method and a device for processing images from image data such that an image to be displayed represents an intuitive view for a vehicle driver of a vehicle.

The invention is distinguished by a method and a corresponding device for the image processing of image data of respective images, which are recorded by multiple cameras that are arranged on a vehicle. A geometry of a three-dimensional environment model is already provided, which has a level ground region that lies in a ground plane of the vehicle and which has a surface that has a ground surface of the level ground region and that encloses an ambient space, which also includes the vehicle. The surface thereby encloses the ambient space in a three dimensional manner.

The image date of the respective images of the various cameras are projected on the surface of the three-dimensional environment model as environment model image data. To that extent, the environment of the vehicle captured by the various cameras is projected in the form of environment model image data on the surface of the three-dimensional environment model.

Image data to be signaled of an image to be signaled from the view of a virtual camera on to the surface of the three-dimensional environment model is detected depending on a specified position of the virtual camera and environment model image data.

This occurs by a view, which includes at least a portion of the vehicle, in the sense that a specified representative object of the vehicle is embedded in the three-dimensional environment model and at least a partial region of the representative object is depicted transparently in such a manner that the view through the partial region on to a respective partial surface region of the surface of the three-dimensional environment model is made possible.

The view of the virtual camera is relative particularly to its virtual camera optics. Image data represents an image point each, which can also be described as a pixel.

The representative object is, in particular, a three-dimensional representative object and the partial region of the representative object is, for example, an exterior skin of the vehicle, such as an engine hood, a radiator grill, a fender and/or a vehicle door.

In this way, assistance is provided by presenting the vehicle driver with a comprehensive image of the vehicle environment, particularly of locations that are not directly visible from his face position, because parts of the vehicle body are in the field of view. In addition, it can thus be avoided that a view from outside the vehicle must be used for this purpose and, in particular, a virtual view, since the latter can possibly be confusing for the vehicle driver because a correspondingly skewed viewing position is required for this purpose.

According to an advantageous embodiment, detecting the image data to be signaled occurs in the view, which includes at least portion of the vehicle, in the sense that a contour of the representative object can be identified. In this way, input is provided in that on the one hand, impeding elements in regard to a view on to the respective partial surface region of the surface of the three-dimensional environment model is possible, as is, on the other hand, a very good orientation for the vehicle driver by means of the simultaneously recognizable contour of the vehicle. In this way, a depiction can result that is of particular value to the customer.

In this context, it is advantageous if the partial region of the representative object is depicted in a partially transparent manner and/or the partial region of the representative object is depicted superimposed by a wire grid model.

According to another advantageous embodiment, the position of the virtual camera in a specified region is defined about a regular face position of the vehicle driver. In this way, a very intuitive view can be automatically adjusted for the vehicle driver.

Other objects, advantages and novel features of the present invention will become apparent from the following detailed description of one or more preferred embodiments when considered in conjunction with the accompanying drawings.

DETAILED DESCRIPTION OF THE DRAWINGS

Elements having an identical design or function are identified with the same reference sign among all the drawings.

Figure 1:
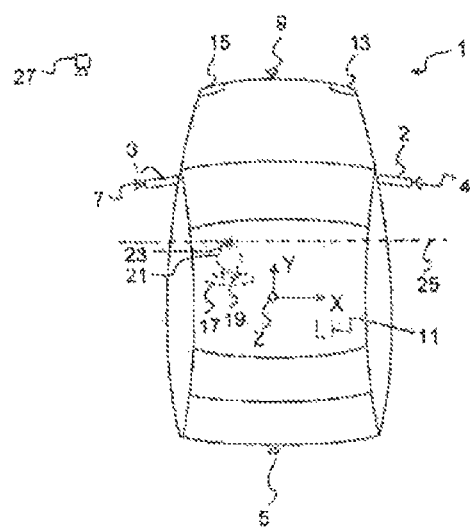
FIG. 1 is a schematic diagram depicting a vehicle with a controller.

A vehicle 1 (FIG. 1) has various cameras. The respective cameras are designed and arranged to record at least a portion of an environment of the vehicle. The respective cameras can be arranged for example in side mirrors 2, 3 of vehicle 1 as first camera 4 or third camera 7. However, cameras can also be arranged, for example, in the rear region of vehicle 1 as second camera 5 or, for example, in a front region of vehicle 1, such as in the region of the radiator grill, as fourth camera 9. By a suitable arrangement of the cameras, in other words of the first to fourth cameras 4, 5, 7, 9, the entire environment of vehicle 1, in other words in particular a circumferential view, can be recorded.

Vehicle 1 also has a controller 11, which is linked to the various cameras in a signal-technical manner such that it can receive image data PIC_RAW of images P_i recorded by the respective camera. In addition, controller 11 can also be linked in a signal-technical manner to additional sensors, which are assigned to vehicle 1. Such sensors can be, for example, a distance sensor, which is based on ultrasound for example.

Controller 11 has a data and program memory and it also has a computer unit, in which programs are processed while vehicle 1 is in operation, said programs being stored particularly in the data and program memory. In addition, controller 11 preferably has an output interface, by which it is coupled in a signal-technical manner to an optical output unit, for example. In this way, an image to be displayed can be provided by means of image data PIC_SIG, and in particular can be provided to a vehicle driver.

Controller 11 can also be described as an image processing unit.

Vehicle 1 also has a first and second front headlight 13, 14, which are arranged on the front of the vehicle. Furthermore, in FIG. 1, there is sketched the contour of a driver seat 17 and a headrest 19. Furthermore, a head 21 of the vehicle driver is depicted and a regular face position 23 of the vehicle driver is marked. A plane 25 of the regular face position 23 is depicted by means of a dashed-dotted line. The plane 25 has, as a perpendicular vector, a vector whose direction corresponds to a longitudinal axis Y of vehicle 1. In addition, X designates a transverse axis of vehicle 1 and Z designates a vertical axis of vehicle 1. Additionally, FIG. 1 also depicts a virtual camera 27, which will be addressed in more detail further below.

Figure 2:
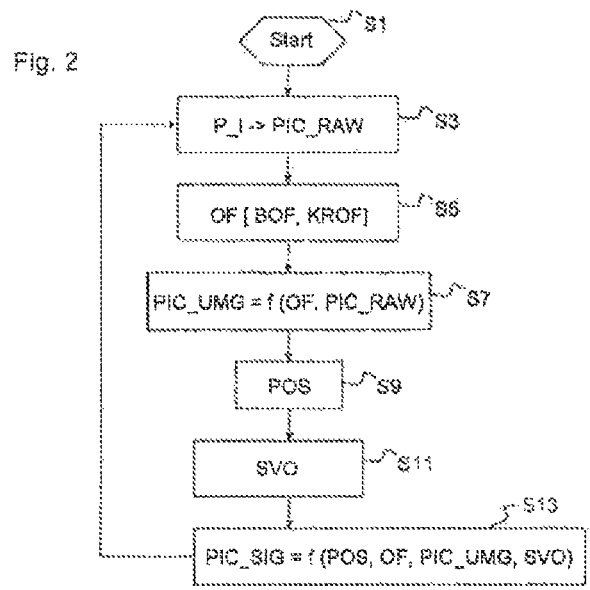
FIG. 2 is a flow chart of a program that is processed in the controller.

A program for image processing, which is executed in controller 11, is started in a step S1 (see FIG. 2), in which variables can be initialized if necessary.

In a step S3, image data PIC_RAW of the respective images, which were captured by the various cameras, are made available. Image data PIC_RAW of an image P_i that was recorded by first camera 4, of an image P_i that was recorded by second camera 5, of an image P_i that was recorded by third camera 7, and of an image P_i that was recorded by fourth camera 9, are thus made available for further processing in the subsequent steps.

A step S5 provides a geometry of a three-dimensional environment model, which has a level ground region, which lies in a ground plane of vehicle 1. The environment model has a surface OF, which has a ground surface BOF and a curved surface KROF (see FIG. 3). Surface OF encloses an ambient space UR. The placement of the environment model occurs in each case relative to a reference coordinate system of vehicle 1.

Figure 3:
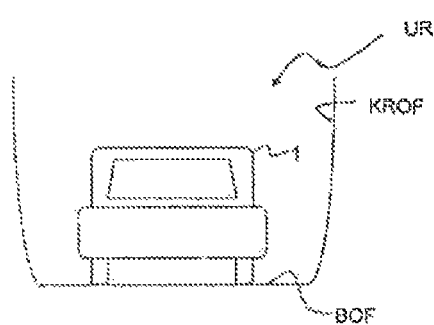
FIG. 3 depicts an illustration of the vehicle in relation to a three-dimensional environment model.

FIG. 3 depicts, for examplary purposes, vehicle 1 and the three-dimensional environment model in a cross-sectional view and, in particular, with ground surface BOF and curved surface KROF.

In a step S7 (FIG. 2), image data PIC_RAW of respective images P_i of the various cameras are projected on surface OF of the three-dimensional environment model as environment model image data PIC_UMG. Thus, image data PIC_RAW of a respective image P_i of first camera 4, second camera 5, third camera 7, and fourth camera 9 are projected on surface OF. In this way, the environment recorded by means of the camera of vehicle 1 is displayed on surface OF of the three-dimensional environment model.

In a step S9, a position POS of virtual camera 27 and a viewing direction of virtual camera 27 relative to a center axis of the camera optics are provided. These can be specified, for example, by the vehicle driver and in particular also in the sense of a selection of various positions offered and/or they can be detected by a different unit within controller 11.

In a step S11, a representative object SVO of vehicle 1 is provided and embedded in the three-dimensional environment model, particularly as a three-dimensional representative object SVO. Basically, this is to be understood so that corresponding data regarding the representative object are embedded in such a manner that representative object SVO is virtually located in ambient space UR in the same way as vehicle 1 according to FIG. 3.

In a step S13, image data PIC_SIG to be signaled of an image to be displayed from a view of virtual camera 27 onto surface OF of the three-dimensional ambient model is determined, particularly taking into account whether the view includes at least a portion of vehicle 1 and thus the specified representative object SVO of vehicle 1. This can be simply determined by taking into account representative object SVO embedded in the three-dimensional environment model in step S11.

Determining image data PIC_SIG to be signaled occurs depending on the specified position POS of virtual camera 27, environment model image data PIC_UMG and representative object SVO. Image data PIC_SIG to be signaled is also determined to that extent depending on the viewing direction of virtual camera 27.

If the view includes at least a portion of vehicle 1, this occurs in the sense that specified representative object SVO of vehicle 1 is depicted transparently in relation to at least one partial region in such a manner that the view through the partial region on to a respective partial surface region of surface OF of the three-dimensional environment model is made possible.

In this context, representative object SVO for example is displayed for the image to be signaled in such a way that its contour is recognizable. This can result in that the partial region of representative object SVO is depicted in a partially transparent manner and/or is depicted overlaid by a wire grid model. In this way, a good orientation of the spatial conditions for the vehicle driver is possible for the image to be displayed.

Figure 4:
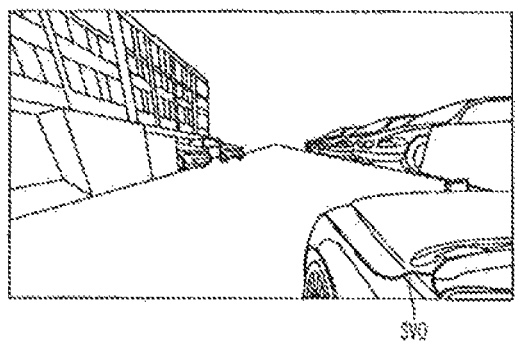
FIG. 4 depicts an illustration of a view with a non-transparently illustrated representative object.
Figure 5:
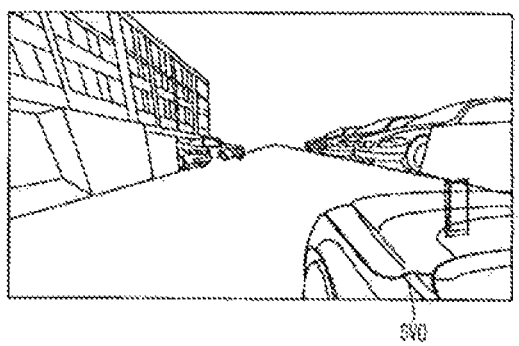
FIG. 5 depicts a view with a partially transparently illustrated representative object.

This is depicted in FIGS. 4 and 5 for examplary purposes. Accordingly, FIG. 4 depicts a corresponding view, in which representative object SVO is displayed in a non-transparent manner. To that extent, on the ground region covered by the representative object, no view is possible. In FIG. 5, representative object SVO is then depicted in such a manner that the partial region of representative object SVO is transparently displayed in such a manner that the view through the partial region on to the respective partial surface region of surface OF of the three-dimensional environment model is made possible. It is thus evident that in this way, a view on to the ground is possible, which is covered by the representative object in FIG. 4. At the same time, the contour of vehicle 1 is visible so that a good orientation is also possible for the vehicle driver. In this case, individual regions are also depicted in a partially transparent manner.

The image data PIC_SIG to be signaled determined in step S13 can then be displayed by way of the optical output unit.

After the processing of step S13, further processing is once again continued in step S3, after a specified waiting period if applicable.

Position POS of virtual camera 27 is specified, for example, in a defined region about the regular face position 23 of the vehicle driver.

In this way, a particularly intuitive view can be implemented for the vehicle driver. The view can be oriented, for example, in the direction of vehicle longitudinal axis Y toward the front of the vehicle or also to one of the sides of the vehicle.

LIST OF REFERENCE SIGNS

1 Vehicle
2, 3 Side mirror
4, 5, 7, 9 Camera
11 Controller
13, 15 First, second front headlight
17 Driver seat
19 Headrest
21 Head of vehicle driver
23 Regular face position of vehicle driver
25 Plane of regular face position
27 Virtual camera
X Transverse axis of vehicle
Y Longitudinal axis of vehicle
Z Vertical axis of vehicle
P_i Image
PIC_RAW Image data
PIC_SIG Image data to be signaled
OF Surface
BOF Ground surface
KROF Curved surface
UR Ambient space
OB Object
PIC_UMG Environment model image data
POS Position of virtual camera
MIR Mirror image mode
SVO Representative object The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for image processing of image data of respective images recorded by multiple cameras arranged on a vehicle, the method comprising the acts of:
   providing a geometry of a three-dimensional environment model having a level ground region lying in a ground plane of the vehicle, and having a surface that includes a ground surface of the level ground region enclosing an ambient space that includes the vehicle;
   projecting image data of the respective images of various cameras on the surface of the three-dimensional environment model as environment model image data;
   determining image data to be signaled of an image to be displayed from a view of a virtual camera onto the surface of the three-dimensional environment model, wherein the view includes at least a portion of the vehicle, wherein a specified representative object of the vehicle is embedded in the three-dimensional model and at least a partial region of the specified representative object is transparently displayed such that a view through the partial region onto a respective partial surface region of the surface of the three-dimensional environment model occurs.

2. The method according to claim 1, wherein the determining of the image data to be signaled for the view of the virtual camera occurs such that a contour of the representative object is recognizable.

3. The method according to claim 1, wherein the partial region of the specified representative object is displayed in a partially transparent manner.

4. The method according to claim 1, wherein the partial region of the specified representative object is superimposed with a wire grid model.

5. The method according to claim 1, wherein a position of the virtual camera is specified in a defined region about a regular face position of the vehicle driver.

6. An image processing unit for image data of respective images recorded by multiple cameras arranged on a vehicle, comprising:
   a controller programmed to:
      provide a geometry of a three-dimensional environment model having a level ground region lying in a ground plane of the vehicle, and having a surface that includes a ground surface of the level ground region enclosing an ambient space that includes the vehicle;
      project image data of the respective images of various cameras on the surface of the three-dimensional environment model as environment model image data;
      determine image data to be signaled of an image to be displayed from a view of a virtual camera onto the surface of the three-dimensional environment model, wherein the view includes at least a portion of the vehicle, wherein a specified representative object of the vehicle is embedded in the three-dimensional model and at least a partial region of the specified representative object is transparently displayed such that a view through the partial region onto a respective partial surface region of the surface of the three-dimensional environment model occurs.

7. The image processing unit according to claim 6, wherein the determining of the image data to be signaled for the view of the virtual camera occurs such that a contour of the representative object is recognizable.

8. The image processing unit according to claim 6, wherein the partial region of the specified representative object is displayed in a partially transparent manner.

9. The image processing unit according to claim 6, wherein the partial region of the specified representative object is superimposed by a wire grid model.

10. The image processing unit according to claim 6, wherein a position of the virtual camera is specified in a defined region about a regular face position of the vehicle driver.

* * * * *